(12) United States Patent
Yasui et al.

(10) Patent No.: US 10,036,434 B2
(45) Date of Patent: Jul. 31, 2018

(54) SELECTABLE ONE-WAY CLUTCH

(71) Applicant: TOYOTA JIDOSHA KABUSHIKI KAISHA, Toyota-shi, Aichi-ken (JP)

(72) Inventors: Hiroki Yasui, Susono (JP); Hiroyuki Shioiri, Yokohama (JP); Hideaki Komada, Gotemba (JP); Hiroyuki Shibata, Odawara (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 53 days.

(21) Appl. No.: 15/168,579

(22) Filed: May 31, 2016

(65) Prior Publication Data
US 2016/0348742 A1 Dec. 1, 2016

(30) Foreign Application Priority Data
Jun. 1, 2015 (JP) .................. 2015-111248

(51) Int. Cl.
| | | |
|---|---|---|
| *F16D 41/14* | (2006.01) | |
| *F16D 41/12* | (2006.01) | |
| *F16D 41/02* | (2006.01) | |
| *F16D 23/12* | (2006.01) | |

(52) U.S. Cl.
CPC ........... *F16D 41/125* (2013.01); *F16D 41/14* (2013.01); *F16D 23/12* (2013.01); *F16D 41/02* (2013.01); *F16D 2300/06* (2013.01); *F16D 2300/22* (2013.01)

(58) Field of Classification Search
CPC ............................. F16D 41/125; F16D 41/14
See application file for complete search history.

(56) References Cited

U.S. PATENT DOCUMENTS

| | | | |
|---|---|---|---|
| 8,267,231 B2* | 9/2012 | Holmes ................. | B60K 6/445 192/43.1 |
| 8,494,738 B2* | 7/2013 | Lee ....................... | F16H 61/686 475/43 |
| 8,622,186 B2* | 1/2014 | Samie .................... | F16H 57/08 192/43.1 |
| 9,611,905 B2* | 4/2017 | Yasui ..................... | F16D 47/04 |
| 9,689,442 B2* | 6/2017 | Shioiri .................. | F16D 41/125 |

(Continued)

FOREIGN PATENT DOCUMENTS

| | | |
|---|---|---|
| JP | 2003-021220 A | 1/2003 |
| JP | 2016-176559 A | 10/2016 |

OTHER PUBLICATIONS

Toyota Technological Publication No. 27938 (in Japanese) with concise explanation of relevance (in English), May 29, 2015.

*Primary Examiner* — Ramya P Burgess
*Assistant Examiner* — David R Morris
(74) *Attorney, Agent, or Firm* — Hunton Andrews Kurth LLP

(57) ABSTRACT

A selectable one-way clutch to prevent a selector plate from being rotated undesirably by a drag torque even if an oil temperature is low. An actuator comprises a casing to which the plunger is inserted while being allowed to reciprocate therein, and a chamber holding a return spring for pushing the plunger out of the casing. The plunger is connected to the selector plate through the arm, and a through hole is formed on the chamber to introduce and discharge oil to/from the chamber.

3 Claims, 4 Drawing Sheets

(56) References Cited

U.S. PATENT DOCUMENTS

| | | | |
|---|---|---|---|
| 2009/0084653 A1* | 4/2009 | Holmes | B60K 6/445 |
| | | | 192/41 A |
| 2010/0063698 A1* | 3/2010 | Lee | F16H 61/686 |
| | | | 701/67 |
| 2012/0138411 A1* | 6/2012 | Samie | F16H 57/08 |
| | | | 192/85.01 |
| 2015/0105205 A1* | 4/2015 | Kurosaki | B60K 6/445 |
| | | | 475/5 |
| 2016/0186818 A1* | 6/2016 | Shioiri | F16D 23/12 |
| | | | 192/69 |
| 2016/0230819 A1* | 8/2016 | Shioiri | F16D 41/14 |
| 2016/0250917 A1* | 9/2016 | Shibata | B60K 6/365 |
| | | | 475/5 |
| 2016/0273595 A1 | 9/2016 | Shioiri et al. | |
| 2016/0290416 A1* | 10/2016 | Hibino | F16D 41/14 |
| 2016/0341263 A1* | 11/2016 | Shioiri | F16D 41/125 |
| 2016/0363179 A1* | 12/2016 | Yasui | F16D 41/14 |
| 2016/0375754 A1* | 12/2016 | Kurosaki | B60K 6/383 |
| | | | 475/5 |
| 2017/0002877 A1* | 1/2017 | Shioiri | F16D 41/14 |
| 2017/0037914 A1* | 2/2017 | Hibino | F16D 41/125 |
| 2017/0067517 A1* | 3/2017 | Miyake | F16D 41/125 |
| 2017/0097054 A1* | 4/2017 | Tomita | F16D 41/185 |
| 2017/0146077 A1* | 5/2017 | Tomita | F16D 41/125 |
| 2017/0198762 A1* | 7/2017 | Miyake | F16D 41/125 |

\* cited by examiner

SELECTABLE ONE-WAY CLUTCH

CROSS REFERENCE TO RELATED APPLICATIONS

The present invention claims the benefit of Japanese Patent Application No. 2015-111248 filed on Jun. 1, 2015 with the Japanese Patent Office, the disclosure of which is incorporated herein by reference in its entirety.

BACKGROUND

Field of the Invention

Preferred embodiment of the present application relates to the art of a selectable one-way clutch adapted to selectively enable torque transmission only in one direction and to interrupt torque transmission in both directions.

Discussion of the Related Art

A selectable one-way clutch is brought into engagement mode by bringing struts held on a pocket plate into engagement with notches formed in a notch plate, and into disengagement mode by rotating a selector plate interposed between the pocket plate and the notch plate in such a manner to push the struts into the pocket of the pocket plate. In the prior art, lubrication device for the selectable one-way clutch have been proposed to prevent malfunction caused by friction acting between the rotary plates.

For example, JP-A-2003-021220 describes a device for delivering oil between a notch plate and a stator. To this end, according to the teachings of JP-A-2003-021220, the stator is provided with a recess formed on a pocket of a stator body, and oil passages connected to the recess.

In the selectable one-way clutch, the pocket plate is fixed to a stationary member, and lubrication oil is applied between the rotary plates. However, the selector plate may be rotated undesirably by a rotation of the notch plate through the lubrication oil. Especially, such drag torque derived from a shearing force of the oil that is applied to the selector plate is increased with an increase in viscosity of the oil. For example, if a temperature of the oil is extremely low, viscosity of the oil is increased significantly. In this situation, the selector plate may be rotated by the drag torque resulting from rotating the notch plate, and as a result, an actuator arm may be actuated to bring the notch plate into engagement undesirably with the pocket plate. Such erroneous engagement of the selectable one-way clutch may be prevented by enhancing an elastic force of a return spring counteracting the drag torque. In this case, however, larger actuator for rotating the selector plate is required to overwhelm the enhanced spring force, and consequently the selectable one-way clutch is enlarged.

SUMMARY

Aspects of a preferred embodiment has been conceived noting the foregoing technical problems, and it is therefore an object of the preferred embodiment is to provide a selectable one-way clutch that can prevent the selector plate from being rotated undesirably by a drag torque even if an oil temperature is low.

Preferred embodiment relates to a selectable one-way clutch, comprising: a pocket plate; a notch plate that is opposed to the pocket plate; a selector plate that is interposed between the pocket plate and the notch plate while being allowed to be rotated relatively with the pocket plate and the notch plate within a predetermined angle to selectively switch an operating mode of the selectable one-way clutch between an engagement mode in which the notch plate is brought into engagement with the pocket plate to enable torque transmission in one direction, and a disengagement mode in which the notch plate is allowed to rotate relatively with the pocket plate in both directions; and an actuator that reciprocates a plunger connected to the selector plate. In order to achieve the above-explained objective, according to the preferred embodiment of the present application, the actuator is provided with an oil damper that generates a viscous resistance of oil to prevent reciprocation of the plunger.

In a non-limiting embodiment, the oil damper may comprise: a piston integrated with the plunger; a chamber holding the piston in such a manner that the piston is allowed to reciprocate therein; oil held in the chamber; and an orifice that increases the resistance of oil flowing therethrough in response to a reciprocation of the piston.

In a non-limiting embodiment, the actuator may comprise a casing to which the plunger is inserted while being allowed to reciprocate therein, and the chamber may be brought into abutment to the casing while covering the plunger. In addition, a return spring may be interposed between the casing and the piston to push the plunger out of the casing.

In a non-limiting embodiment, the orifice may include a through hole formed on the chamber to provide a communication between an internal space and an external space of the chamber.

According to the preferred embodiment, the operating mode of the selectable one-way clutch is switched by rotating the selector plate between an engagement mode in which the notch plate is brought into engagement with the pocket plate to enable torque transmission in one direction, and a disengagement mode in which the notch plate is allowed to rotate relatively with the pocket plate in both directions. When the notch plate is rotated, the selector plate may be subjected to a drug torque to undesirably reciprocate the plunger connected thereto. However, the selectable one-way clutch according to the preferred embodiment is provided with the oil damper that generates a viscous resistance of oil to prevent reciprocation of the plunger. According to the preferred embodiment, therefore, the selector plate can be prevented from being rotated by the drag torque to avoid undesirable engagement of the selectable one-way clutch. In addition, since the resistance against the drag torque can be increased, it is not necessary to use a larger return spring to enhance the elastic force. For this reason, the selectable one-way clutch can be prevented from being enlarged to be fit easily into any kind of automobiles.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE ILLUSTRATIVE EMBODIMENT(S)

The selectable one-way clutch (to be abbreviated as the "SOWC" hereinafter) may be applied to a power transmission unit of automobiles. To this end, an operating mode of the SOWC is selectively shifted between an engagement mode and a disengagement mode by rotating a selector plate at a predetermined degree by a linear reciprocating motion of an actuator.

Figure 1:
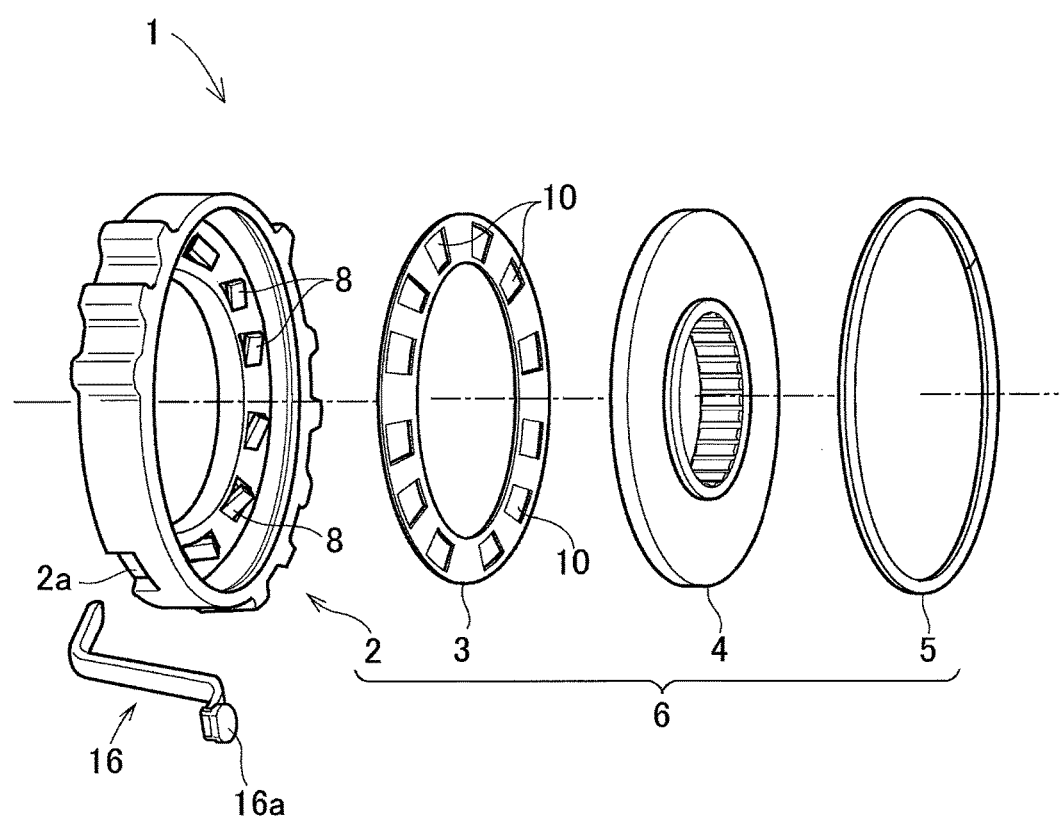
FIG. 1 is an exploded view of the selectable one-way clutch according to the preferred embodiment.

Referring now to FIG. 1, there are shown each part of a body assembly 6 of the SOWC 1 in detail. As shown in FIG. 1, the body assembly 6 of the SOWC 1 comprises a pocket plate 2 as a stationary member, a selector plate 3 as a selector member, and a notch plate 4 as a rotatable member. The pocket plate 2 comprises an outer cylinder and an annular plate formed along an inner circumference of the cylinder. The selector plate 3 and the notch plate 4 are held in the cylinder in the order shown in FIG. 1, and a snap ring 5 is fitted into a clearance between an outer circumference of the notch plate 4 and an inner circumference of the cylinder of the pocket plate 2 to close the pocket plate 2.

Figure 2A:
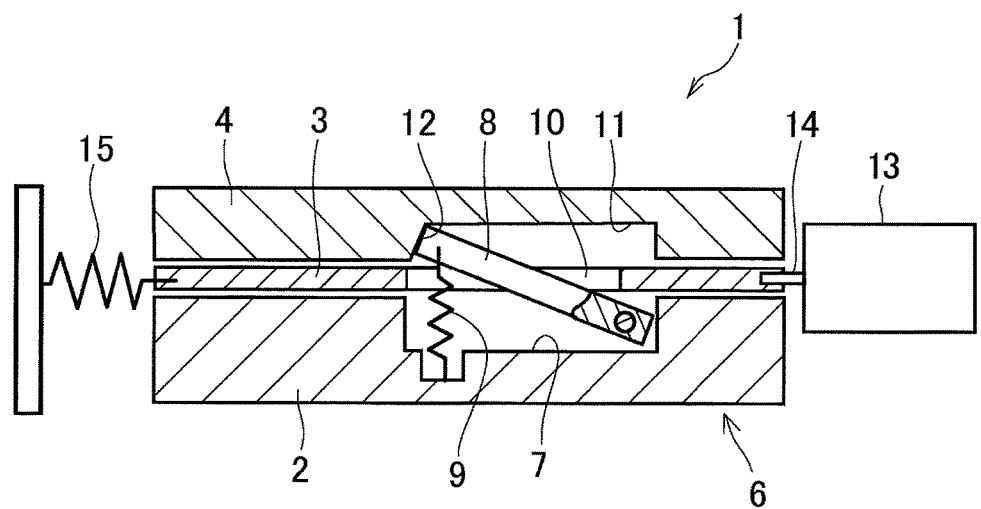
FIG. 2a is a schematic illustration showing the selectable one-way clutch in engagement mode.
Figure 2B:
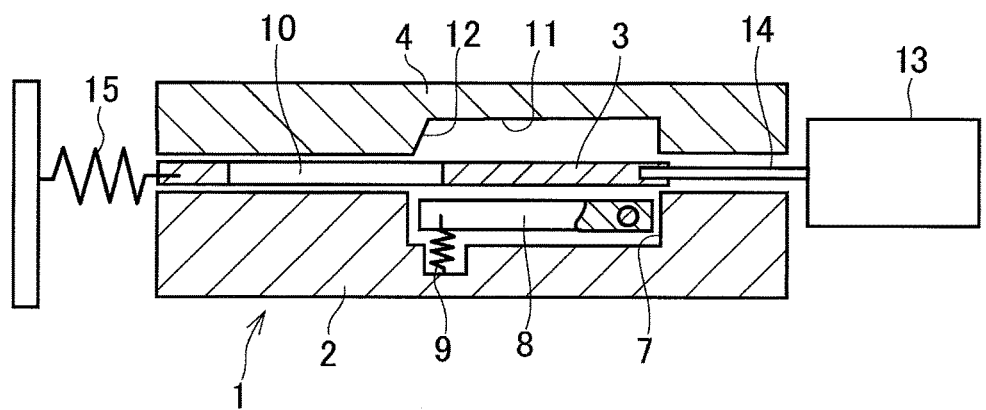
FIG. 2b is a schematic illustration showing the selectable one-way clutch in disengagement mode.

A cross-section of the SOWC 1 thus assembled is partially shown in FIGS. 2a and 2b. As illustrated in FIGS. 2a and 2b, a plurality of pockets (or depressions) 7 are formed in a circular manner on a face of the annular plate of the pocket plate 2 being opposed to the notch plate 4, and a rectangular strut 8 is individually held in each pocket 7 in a pivotal manner around one end thereof as a fulcrum. In order to push up the other end of the strut 8 toward the notch plate 4, a spring 9 is interposed between one end of the strut 8 and a bottom of the pocket 7.

The selector plate 3 is an annular member having similar dimensions as the annular plate of the pocket plate 2, and apertures 10 are formed on the selector plate 3 in a circular manner and in a same number as the pockets 7. As shown in FIG. 2a, when the selector plate 3 is rotated in the pocket plate 2 to an engagement position at which the apertures 10 are individually overlapped with each of the pockets 7, said other end (to be called the "leading end" hereinafter) of each strut 8 is allowed to be pushed up by the spring 9 to be brought into engagement with an after-mentioned notch 11 of the notch plate 4. By contrast, when the selector plate 3 is rotated to a disengagement position at which the apertures 10 are individually displaced from each of the pockets 7, each strut 8 is pushed into the pocket 7 by the selector plate 3 as shown in FIG. 2 (b).

The notch plate 4 is also an annular member, and the notches 11 are formed on a face of the notch plate 4 facing to the pocket plate 2 in a circular manner and in the same number as the pockets 7. When the leading end of the strut 8 is pushed into the notch 11 through the aperture 10, the leading end of the strut 8 is brought into abutment to an engagement wall 12.

In order to rotate the selector plate 3 between the positions shown in FIGS. 2a and 2b, the SOWC 1 is provided with an actuator 13. The actuator 13 comprises a plunger 14 serving as an actuation member that is actuated lineally by an electromagnetic force or a hydraulic pressure. According to the example shown in FIGS. 2a and 2b, a solenoid actuator is employed as the actuator 13, and the plunger 14 is constantly pushed by a return spring 15. That is, the plunger 14 is elastically pushed out of the actuator 13 by the return spring 15 by stopping current supply to the actuator 13 to rotate the selector plate 3 to the disengagement position shown in FIG. 2b. By contrast, the plunger 14 is pulled into the actuator 13 against the elastic force of the return spring 15 by energizing the actuator 13 to rotate the selector plate 3 to the engagement position shown in FIG. 2a. Here, it is to be noted that FIGS. 2a and 2b are merely schematic illustrations for explaining a principle of rotating the selector plate 3 by the actuator 13, therefore, an actual structure connecting the actuator 13 and the selector plate 3 is different from that shown in FIGS. 2a and 2b. Specifically, as described later, the return spring 15 is fitted onto the plunger 14 in such a manner to push a leading end of the plunger 14.

Figure 3:
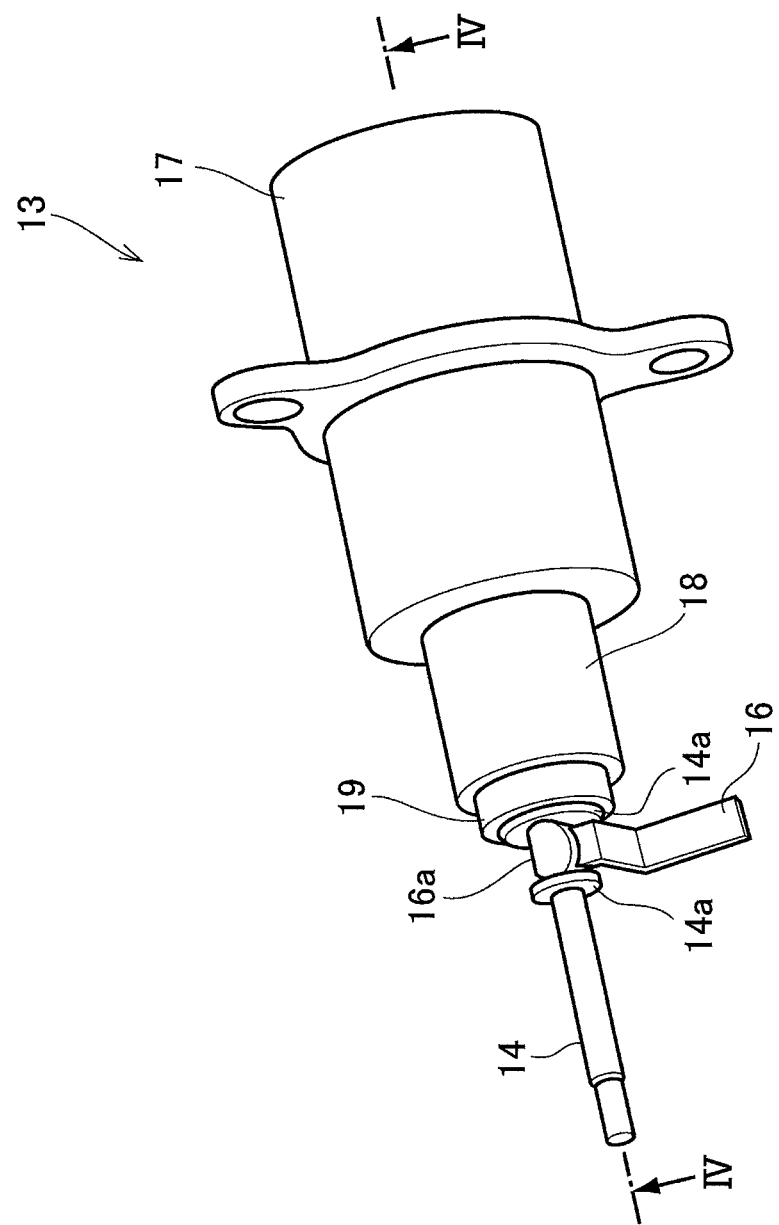
FIG. 3 is a perspective view of the actuator.

Turning back to FIG. 1, the selector plate 3 and the actuator 13 are connected through an arm 16. Specifically, as illustrated in FIG. 1, the arm 16 is a cranked rod member. One of the end portions of the arm 16 is inserted into a through hole 2a of the pocket plate 2 from outside to be connected to the selector plate 3 in such a manner as to be rotated integrally therewith. An intermediate portion of the arm 16 is bent to extend parallel to the cylinder of the pocket plate 2, and the other end of the arm 16 is bent radially outwardly at a point further than the cylinder of the pocket plate 2. In addition, a semi-circular piece 16a is attached to the other leading end of the arm 16. As illustrated in FIG. 3, the semi-circular piece 16a is disposed between a pair of collars 14a, and rotated around the cylinder of the pocket plate 2 by a linear motion of the plunger 14 of the actuator 13. Consequently, the arm 16 is rotated to move the selector plate 3 to the aforementioned engagement position or the disengagement position. In this situation, although the semi-circular piece 16a is pushed by a linear motion of the actuator 13 through the collar 14a, friction between the semi-circular piece 16a and the collar 14a may be absorbed by a round edge of the semi-circular piece 16a.

Figure 4:
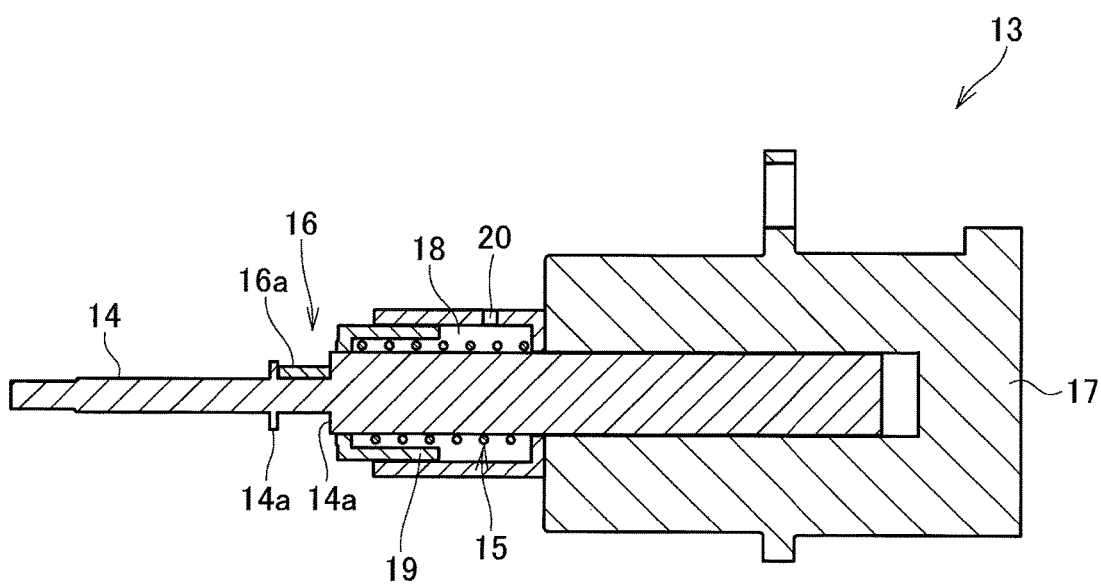
FIG. 4 is a cross-sectional view of the actuator along IV-IV line in FIG. 3.

As shown in FIGS. 3 and 4, the actuator 13 comprises a solenoid activated electromagnetically to pull the plunger 14 as a rod member into a casing 17 (i.e., toward right side in FIG. 4) to bring the SOWC 1 into the engagement mode. By contrast, the plunger 14 is pushed out of the casing 17 (i.e., toward left side in FIG. 4) by the return spring 15 when the solenoid is inactivated to bring the SOWC 1 into the disengagement mode. Thus, the plunger 14 is reciprocated by the actuator 13 and the return spring 15 to rotate the selector plate 3 by the arm 16 between the engagement position and the disengagement position.

Specifically, the return spring 15 is fitted onto the plunger 14 in a chamber 18 formed between the collar 14a and the casing 17 in such a manner as to push the plunger 14 out of the casing 17. That is, the return spring 15 is compressed in the chamber 18 so as to push the plunger 14 out of the casing 17 when the actuator 13 is not energized.

The chamber 18 is a cylindrical member covering the plunger 14, and a bottom face thereof is brought into abutment to the casing 17. A cylinder 19 serving as a piston is formed integrally with one of the collars 14a, and a leading end thereof is inserted into the chamber 18 in such a manner as to maintain a liquid-tight condition in the chamber 18 while being allowed to reciprocate therein. That is, the return spring 15 pushes the cylinder 19 toward the left side in FIG. 4, and a capacity of the chamber 18 is changed depending on an axial position of the cylinder 19. In order to introduce and discharge lubrication oil to/from the chamber 18 depending on the capacity of the chamber 18, a through hole 20 as an orifice is formed on a predetermined portion of the chamber 18. That is, the through hole 20 is formed on the chamber 18 in such a manner to provide a communication between an internal space and an external space of the chamber 18. That is, the chamber 18 may serve as a shock absorber or an oil damper to apply resistance generated by letting the oil through the through hole 20 to the plunger 14 so that the plunger 14 can be prevented from being pushed into the casing 17 of the actuator 13 by the drag torque or the like.

As described, the SOWC 1 is brought into the disengagement mode by inactivating the actuator 13. In this situation, the plunger 14 is pushed out of the casing 17 by the return spring 15 so that the semi-circular piece 16a attached to the leading end of the arm 16 is displaced toward the left side in FIG. 4. Consequently, the selector plate 3 is rotated at a predetermined angle so that the apertures 10 are individually displaced from the pockets 7 while pushing the struts 8 into the pockets 7. That is, the selector plate 3 is rotated to the disengagement position so that the notch plate 4 is brought into disengagement from the pocket plate 2. In this situation, therefore, the notch plate 4 is allowed to rotate relatively with respect to the pocket plate 2 in both directions.

When the actuator 13 is energized, the plunger 14 is pulled into the casing 17 by an electromagnetic force against the elastic force of the return spring 15. Consequently, the collars 14a of the plunger 14 holding the semi-circular piece 16a therebetween is pulled toward the actuator 13 so that the selector plate 3 is rotated by the arm 16 to the engagement position at which the apertures 10 are individually overlapped with the pockets 7 and hence the leading end of each of the strut 8 is individually pushed into the notch 11. In this situation, if the notch plate 4 is rotated in the direction toward the leading end of the strut 8, the engagement wall 12 of each of the notch 11 is individually brought into contact to the leading end of the strut 8 to enable torque transmission between the pocket plate 2 and the notch plate 4 through the struts 8.

By contrast, if the notch plate 4 is rotated in the direction away from the leading end of the strut 8, each of the strut 8 is individually pushed into the pocket 7 by an opening edge of the notch 11 to be brought into disengagement from the notch 11. In this case, therefore, the SOWC 1 is brought into an overrunning mode in which the notch plate 4 is allowed to rotate in this direction.

Thus, the operating mode of the SOWC 1 is switched by reciprocating the plunger 14 of the actuator 13. However, if a temperature of the lubricating oil is extremely low when e.g., starting the engine, the selector plate 3 may be rotated together with the arm 16 toward the engagement position by a drag torque through the lubricating oil whose viscosity is extremely high, and consequently the notch plate 4 may be brought into engagement undesirably with the pocket plate 2. In order to avoid such disadvantage, according to the preferred embodiment, the actuator 13 is provided with the chamber 18 adapted to restrict reciprocation of the plunger 14 by the flow resistance of the lubrication oil passing through the through hole 20. Specifically, even if the selector plate 3 is subjected to the drag torque toward the engagement position when the actuator 13 is inactivated, the plunger 14 can be prevented from being pushed into the casing 17 of the actuator 13 by the flow resistance of the lubrication oil being discharged from the chamber 18 through the through hole 20, in addition to the pushing force of the return spring 15. According to the preferred embodiment, therefore, the selector plate 3 will not be rotated to the engagement position even if the temperature of the lubrication oil is extremely low so that the notch plate 4 can be prevented from being engaged undesirably with the pocket plate 2. In addition, since the resistance against the drag torque to rotate the selector plate 3 toward the engagement position is thus increased, it is not necessary to use a larger return spring 15 to enhance the elastic force. For this reason, the SOWC 1 can be prevented from being enlarged to be fit easily into any kind of automobiles.

Here, it is to be noted that the lubrication oil can be discharged smoothly from the through hole 20 if the temperature of the lubrication oil is not extremely low and hence the SOWC 1 can be smoothly brought into the engagement mode without delay.

Although the above exemplary embodiment of the present application have been described, it will be understood by those skilled in the art that the present application should not be limited to the described exemplary embodiment, and various changes and modifications can be made within the spirit and scope of the present application. For example, a piston formed in such a manner as to divide an internal space of the chamber 18 into two rooms may also be used instead of the cylinder 19. In this case, the through hole may be formed on the piston.

What is claimed is:

1. A selectable one-way clutch, comprising:
a pocket plate;
a notch plate that is opposed to the pocket plate;
a selector plate that is interposed between the pocket plate and the notch plate while being allowed to be rotated relatively with the pocket plate and the notch plate within a predetermined angle to selectively switch an operating mode of the selectable one-way clutch between an engagement mode in which the notch plate is brought into engagement with the pocket plate to enable torque transmission in one direction, and a disengagement mode in which the notch plate is allowed to rotate relatively with the pocket plate in both directions; and
an actuator that reciprocates a plunger connected to the selector plate;
wherein the actuator comprises an oil damper that generates a viscous resistance of oil to prevent reciprocation of the plunger.

2. The selectable one-way clutch as claimed in claim 1, wherein the actuator comprises:
a piston integrated with the plunger;
a chamber holding the piston in such a manner that the piston is allowed to reciprocate therein;
oil held in the chamber; and
a through hole formed on the chamber to introduce and discharge oil to/from the chamber,
wherein the through hole serves as an orifice that increases the resistance of the oil flowing through the through hole in response to a reciprocation of the piston.

3. The selectable one-way clutch as claimed in claim 2, wherein the actuator comprises a casing to which the plunger is inserted while being allowed to reciprocate therein,
wherein the chamber is brought into abutment to the casing while covering the plunger, and
wherein a return spring is interposed between the casing and the piston to push the plunger out of the casing.

* * * * *